April 10, 1934.   H. S. DE MALAUSSENE   1,954,563
GENERATOR REGULATOR FOR MOTOR VEHICLES EQUIPPED WITH FREEWHEELING
Filed April 6, 1932
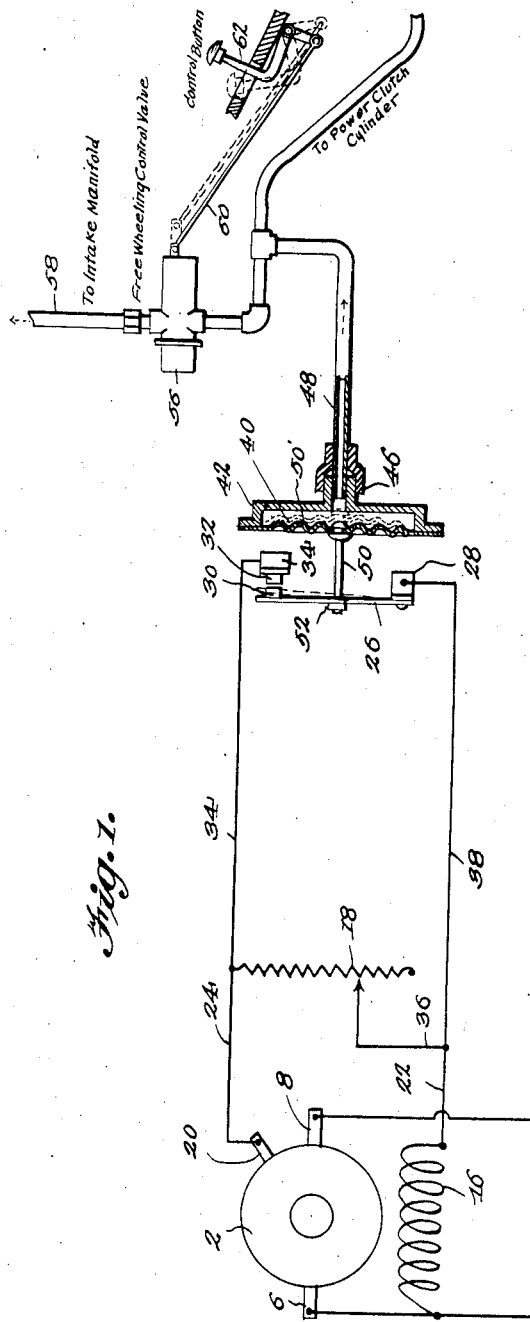
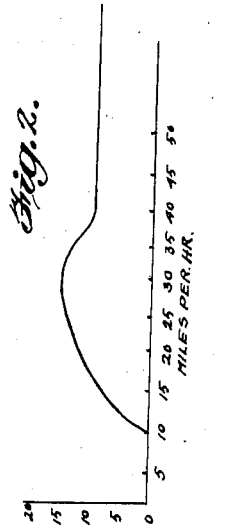
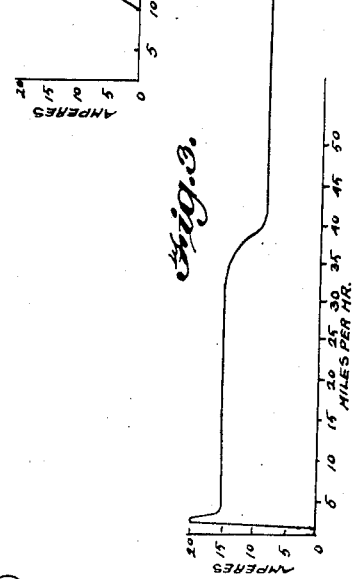
Inventor
HENRI S. DEMALAUSSENE
By
Attorney Patented Apr. 10, 1934

1,954,563

UNITED STATES PATENT OFFICE 1,954,563

GENERATOR REGULATOR FOR MOTOR VEHICLES EQUIPPED WITH FREEWHEELING

Henri S. de Malaussene, Santa Monica, Calif., assignor to Adolph L. Bernheimer, Santa Monica, Calif.

Application April 6, 1932, Serial No. 603,613

6 Claims. (Cl. 290—7)

The present invention relates to a regulator and more particularly to a regulator which is adapted to automatically regulate the generator output current of a motor vehicle.

When the engine of a motor vehicle is idling at a speed below 10 miles per hour, which occurs when driving through traffic, due to stop and go signals, or in motor vehicles which are equipped with free wheeling, the output of the generator which is driven by the engine of the vehicle is below the normal charging rate of the battery, and as a result the battery does not receive its normal charge and the life thereof is shortened.

This is especially true now that the majority of vehicles are equipped with free wheeling and it is one of the objects of the present invention to provide a generator regulating device which is actuated by the free wheeling mechanism so that when the vehicle is operating in free wheeling and the motor which drives the generator is idling, the output of the generator will be maintained constant and the battery will receive its normal charge and thereby increase the life thereof.

Another important object of the invention is to provide a regulating device which is automatically controlled by the free wheeling mechanism and is entirely automatic in its nature.

The invention contemplates the provision of a variable resistance in series with the shunt field of the generator and the field regulating brush, and an electrical switch which is in shunt with the variable resistance and automatically actuated by the free wheeling mechanism, to the end that the switch is automatically opened and closed to maintain the output current of the generator constant.

In the accompanying drawing, forming a part of this application, and in which like numerals are employed to designate like parts throughout the same, Figure 1 is an electrical diagram of connections, Figure 2 is a curve in which the ampere output is plotted against the miles per hour of the ordinary generator now in use, Figure 3 is a curve in which the ampere output is plotted against the miles per hour of the present invention.

In the drawing, wherein for the purpose of illustration is shown a preferred embodiment of the invention, the numeral 2 represents diagrammatically the armature of a usual battery charging generator which is driven by the engine of a motor vehicle. The output brushes 6 and 8 of the generator are connected by conductors 10 and 12 to the battery 14 of the motor vehicle. The field 16 has one terminal connected to the brush 6 through the conductor 10 and the other terminal thereof is connected in series with the variable resistance 18 and the field regulating brush 20 through the conductors 22 and 24. A contact arm 26 has one end thereof securely fastened to a support 28 and on the other end is provided with an electrical contact 30 which has associated therewith a stationary electrical contact 32 mounted on a support 34. The stationary electrical contact is connected to one end of the variable resistance 18 through the conductor 34 and the movable contact arm 26 is connected to the variable switch arm 36 of the variable resistance by the conductor 38. Thereby, as is clearly illustrated in the drawing, the movable switch arm and its associated electrical contact is connected in shunt with the variable resistance.

The actuation of the resilient movable contact arm 26 is controlled by means of a corrugated flexible diaphragm 40 which is mounted in a casing 42 provided with a nipple 46 which has connected thereto a conduit 48 which in turn is connected to a sliding valve 56 of the free wheeling mechanism. The sliding valve 56 communicates with the intake manifold through a conduit 58 and the actuation of the sliding valve 56 is brought about by means of a lever 60 connected at one end to the slide valve and at the other end to a control button 62. The resilient contact arm 26 is connected to the flexible diaphragm 40 by means of a push rod 50 which is securely fastened in the diaphragm 40 at one end and to the movable contact arm in its other end by means of a nut 52. The nut 52 forms a means of adjustment of the relative position of the electrical contact 30 and its stationary electrical contact 32.

To install the device, the field regulating brush 20 is moved to its full output position of the generator which is about 20 amperes on all standard cars, then the resistance 18 is adjusted until the ammeter reads about 15 amperes which is a safe charging rate and the switch is in open position and the engine of the motor vehicle is running at high speed.

The adjusting nut 52 is adjusted so that the contact arm 26 is normally in its open position when the engine of the motor vehicle is running at high speed, the variable resistance being in the field circuit so that it responds only when the highest vacuum has been created in the intake manifold of the engine and at a point where the carburetor throttle is closed for idling purposes.

As is clearly illustrated, the conduit 48 communicates with the slide valve 56 of the free wheeling mechanism and when the motor is operating at high speeds and the control button 62 is in free wheeling position there is a decreased vacuum in the chamber 50. The tension of the resilient contact arm 26 maintains the electrical contacts 30 and 32 in open position. When the car is idling and the control button is in free wheeling position there is an increasing vacuum in the chamber 50 overcoming the normal pull of the resilient contact arm 26 closing the associated electrical contacts 30 and 32 shorting out the variable resistance 18, thus permitting more current to flow through the field which will, in turn, bring the generator's output up to a maximum output or charging rate although running at slow speed.

Figure 2 is a curve illustrating the output charging current of the ordinary generator which is not equipped with the present regulating means. As is clearly illustrated in this curve when the motor vehicle is running at slow speeds and consequently driving the generator at a slow speed, say for example, 10 miles per hour, there is no output current and the generator does not provide a sufficient output charging current to the battery until the motor vehicle has reached a speed of substantially 25 to 30 miles per hour.

In Figure 3 there is shown a curve in which the ampere output current is plotted against the mileage of the vehicle which drives the generator. It will be seen from this curve that the normal output charging current of 15 amperes is reached at the usual idling speed of 10 miles per hour and from a speed of 10 to 35 miles per hour, the output of 15 amperes is substantially constant.

The variable resistance 18 enables the output of the generator to be set substantially at any output value. If so desired, the control mechanism controlling the actuation of the electrical switch for shorting out the valve resistance may be included within the generator, the same being built as a single unit.

It will thus be seen and appreciated that there is provided an automatic regulating device which maintains the output of the generator substantially constant and which is automatically controlled through the free wheeling valve, to the end that when the car is operating in free wheeling and the engine of the motor vehicle idling, the battery is receiving its normal charging current as well as when running at high speeds.

While there is shown only one embodiment of the invention in the accompanying drawing, it is capable of various changes and modifications without departing from the spirit thereof and it is intended therefore, that only such limitations shall be imposed thereon as are indicated in the prior art or in the appended claims.

Having thus described the invention, what is claimed is:—

1. In combination with a motor vehicle having a vacuum controlled free wheeling mechanism and a generator driven by said vehicle for charging a battery, an output regulating device for said generator comprising a resistance in series with the shunt field of the generator, an electrical switch connected in shunt with said resistance, and a vacuum actuated means connected to the vacuum system of the free wheeling mechanism for actuating said switch.

2. In combination with a motor vehicle having a vacuum controlled free wheeling mechanism and a generator driven by said vehicle for charging a battery, an output regulating device for said generator comprising a resistance in series with the shunt field of the generator, an electrical switch connected in shunt with said resistance, vacuum actuated means connected to said switch, said vacuum means communicating with the vacuum system of the free wheeling mechanism for closing said switch when the motor vehicle is operating in free wheeling.

3. In combination with a motor vehicle having a vacuum operating free wheeling mechanism and a generator driven by said vehicle for charging a battery, an output regulating device for said generator comprising a variable resistance in series with shunt field of the generator, a normally open switch connected in shunt with said variable resistance, vacuum actuating means for closing said switch, said vacuum actuated means communicating with the vacuum system of the free wheeling mechanism and being adapted to close said switch when the motor vehicle is operating in free wheeling.

4. In combination with a third brush motor vehicle generator having a predetermined third brush adjustment, adapted to charge the battery of the motor vehicle, a variable resistance in the field circuit of said generator whereby the third brush may be positioned at the maximum output position and the field current adjusted by varying the variable resistance to select a constant output current, a make-and-break switch connected in shunt with said resistance, and vacuum actuated means controlled by the motor of said vehicle for actuating said make-and-break switch whereby said constant output current is maintained over a broad range of speeds of the motor vehicle.

5. In combination with a third brush motor vehicle generator having a predetermined third brush adjustment, adapted to charge the battery of the motor vehicle, a resistance in the field circuit of said generator, the third brush being positioned at its maximum output position, a make-and-break switch connected in shunt with said resistance, and vacuum actuated means controlled by the motor of said vehicle for actuating said make-and-break switch, said resistance being of value to give the desired third brush regulation when the resistance is effective and to provide for a constant output current whereby said constant output current is maintained over a broad range of speeds of the motor vehicle.

6. In combination with a third brush motor vehicle generator having a predetermined third brush adjustment adapted to charge the battery of the motor vehicle, a resistance in the field circuit of said generator, the third brush being positioned at its maximum output position, a make-and-break switch connected in shunt with said resistance, and means responsive to engine conditions for actuating said make-and-break switch, said resistance being of a value to give the desired third brush regulation when the resistance is effective and to provide for a constant output current whereby said constant output current is maintained over a broad range of speeds of the motor vehicle.

HENRI S. DE MALAUSSENE.